(No Model.)
D. DU BOULAY.
MOTOR.
No. 380,648. Patented Apr. 3, 1888.
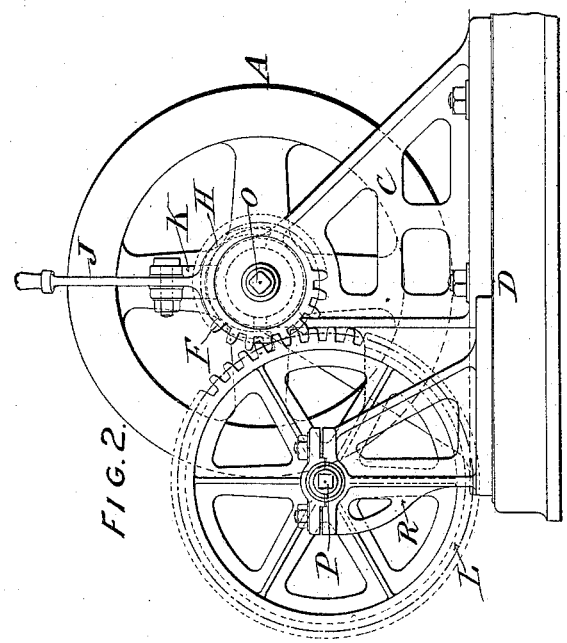
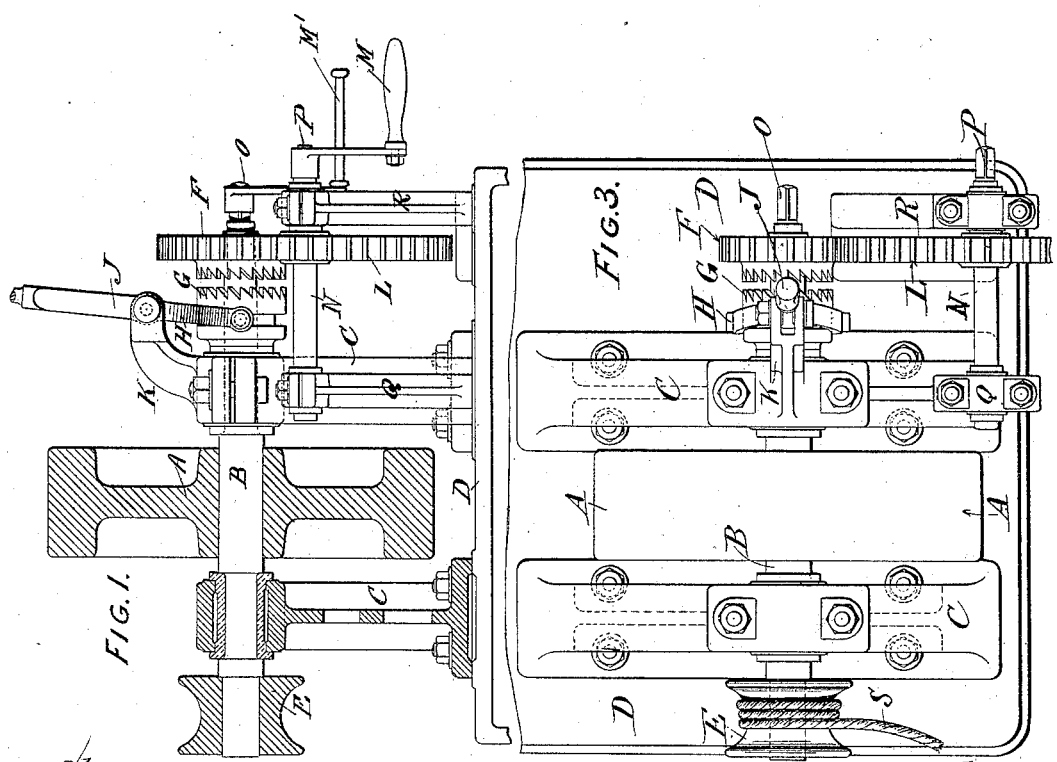
Witnesses.
Inventor
Digby du Boulay.

UNITED STATES PATENT OFFICE.

DIGBY DU BOULAY, OF LONDON, ENGLAND.

MOTOR.

SPECIFICATION forming part of Letters Patent No. 380,648, dated April 3, 1888.

Application filed March 7, 1887. Serial No. 229,898. (No model.) Patented in England December 24, 1886, No. 16,915; in France February 22, 1887, No. 181,730, and in Germany February 23, 1887, No. 41,797.

*To all whom it may concern:*

Be it known that I, DIGBY DU BOULAY, a subject of the Queen of England, residing at London, in England, have invented a new and useful Motor for Shunting Rolling-Stock, and generally for the movement of heavy bodies, (for which I have obtained a patent in England, No. 16,915, December 24, 1886; in France, No. 181,730, February 22, 1887, and in Germany, No. 41,797, February 23, 1887,) of which the following is a specification.

This invention relates to means by which heavy bodies may be moved or set in movement, its purpose being principally for the shunting of railway-vehicles and lifting of goods.

The invention consists in so mounting a heavy fly-wheel or other body that it may be brought into rotation, the momentum of the revolving fly-wheel or body being afterward converted into a force operating on the matter to be moved in the direction in which it is to travel or to be lifted.

Referring to the accompanying drawings, which illustrate the means for carrying out my invention, Figure 1 is a sectional elevation of the motor; Fig. 2, a side elevation, and Fig. 3 a plan thereof.

A is a heavy fly-wheel, mounted on the shaft B, journaled in bearings C C, firmly attached to a suitable foundation, D.

E is a pulley fixed on the shaft; F, a toothed pinion having clutch-teeth on one side and revolving loosely on the shaft; G, a clutch revolving with the shaft and operated so as to engage the pinion F by suitable means—such as lever J—with fork H.

L is a large toothed wheel mounted on a shaft, N, journaled in bearings Q and R, said toothed wheel gearing with the pinion F and operated by crank M, fitted onto the square head P.

The crank M' being placed on the square head O, the shaft B may be set in slow rotation. When sufficient speed is given to the fly-wheel A, the crank M' may be shifted to the head P (or a separate crank, M, as shown, may be used) and the clutch G engaged. By revolving the crank M on the head P the speed of the fly-wheel A may be still further increased. A rope, S, attached to the vehicle or matter to be moved or raised, is brought near the pulley E. The clutch G is disengaged, and two or three turns of the rope are made over the pulley E, so that the whole force of the revolving fly-wheel or body A is exerted as a direct pull on the vehicle or other object to be moved.

In large yards a suitable number of these apparatus should be placed at convenient stations, so as to enable the rolling-stock or other matter to be moved in any part of the yard or in any direction that may be required.

When used for shunting purposes, the motor herein described may also be mounted on a truck or carriage adapted to run on rails, this truck or carriage being attached to the vehicles to be shunted. The fly-wheel, having attained the required momentum, will then be geared by pulley E to the axles or wheels of the truck, so as to propel the latter, and so shunt the vehicles.

I do not confine myself to any special details in the construction or arrangement of the parts.

What I claim is—

In a motor for setting in motion and moving railway rolling-stock and lifting materials and for other purposes, the combination of a fly-wheel, A, mounted on a shaft, B, adapted to revolve, a pulley, E, on the same shaft, a clutch, G, thereon, a toothed wheel, F, on said shaft, and square head O, with toothed wheel L, gearing into toothed wheel F, and square head P, for operating said toothed wheel L by means of a hand-crank, substantially as and for the purpose set forth.

In testimony whereof I have signed this specification in the presence of two subscribing witnesses.

DIGBY DU BOULAY,
*Captain of the Seventh Dragoon Guards.*

Witnesses:
T. A. RAE,
R. HADDAN.